Dec. 31, 1946. R. D. POMEROY 2,413,375
METHOD OF AND APPARATUS FOR TREATING LIQUIDS
Filed May 22, 1943 2 Sheets-Sheet 1
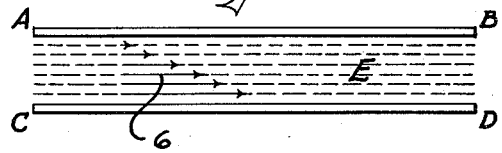
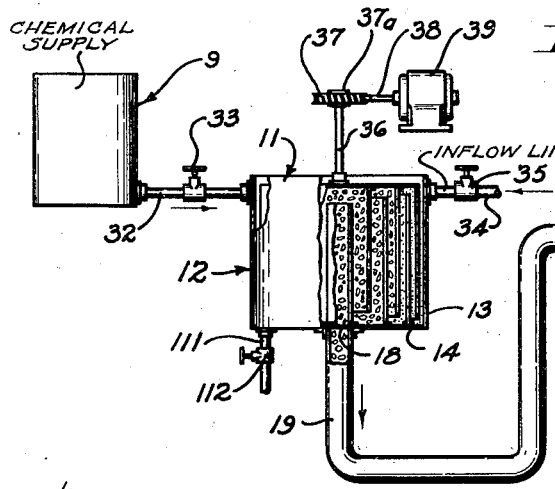
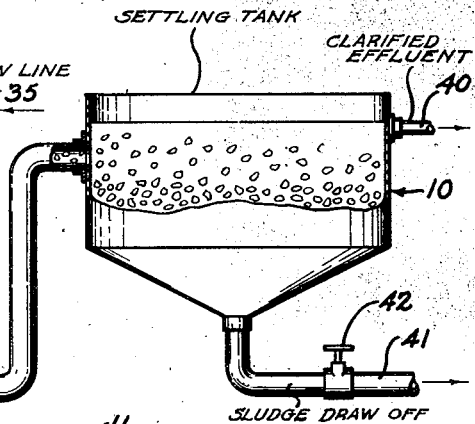
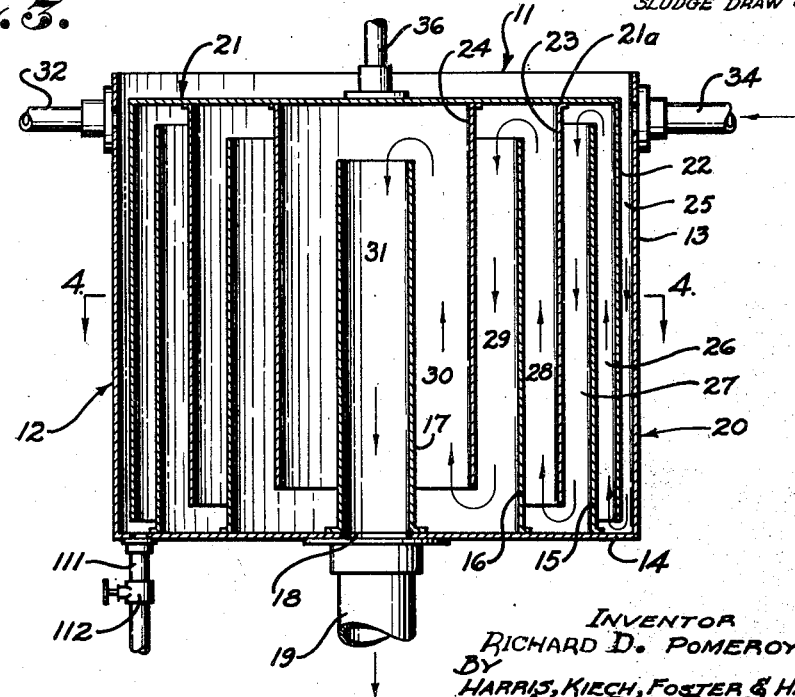
INVENTOR
RICHARD D. POMEROY
BY
HARRIS, KIECH, FOSTER & HARRIS
ATTORNEYS

INVENTOR
RICHARD D. POMEROY
BY HARRIS, KIECH, FOSTER & HARRIS
ATTORNEYS

UNITED STATES PATENT OFFICE 2,413,375

METHOD OF AND APPARATUS FOR TREATING LIQUIDS

Richard D. Pomeroy, Altadena, Calif., assignor of one-half to H. Darwin Kirschman, Tujunga, Calif.

Application May 22, 1943, Serial No. 488,004

9 Claims. (Cl. 259—8)

This invention relates to a method of and apparatus for the treatment of liquids to remove a material distributed therein. It finds particular utility in the treatment of liquids such as water, sewage, and industrial waste water containing material distributed or dispersed therein, as a solute or suspensoid or emulsoid, colloidal or otherwise, and the advantages of my invention will be stated with regard to such uses, it being understood that neither the method nor the apparatus of my invention is restricted to such uses.

The materials which it is desired to remove from such liquids may be present therein as solids in such a finely divided state as to make their removal therefrom by subsidence or sedimentation impracticable, or they may be present in such a state as to require their removal for practical purposes by a coagulating agent.

In accordance with my invention materials of the former class and materials of the latter class, after the liquid has been given a chemical dosing, as, for example, with ferric chloride, or aluminum sulfate, or hydrated lime, are gathered together into bodies of mass sufficient to permit their comparatively rapid and substantially complete separation from the liquid by subsidence, sedimentation, or filtration. This growth in the size of the bodies of the particles of materials which it is desired to remove from the liquid may be by agglutination, aggregation, coagulation, coalescence, flocculation, agglomeration, cohesion, adhesion, the union of particles due to differences in their electrical charges, or entrapment of the dispersed particles by a precipitant formed during or after its formation in the liquid, these and all other forms of such growth being included within the terms "aggrandizing association" or "association," "agglomerating," "flocculating" and the like as employed herein.

In all such forms of removal of a material from a liquid it is necessary to bring the particles of the material to be associated into contact with each other to form larger bodies or flocs, which, because of their larger size and mass, can with greater facility be removed by sedimentation or filtration. It is particularly important that those particles of the material of the smallest size be gathered in such flocs, since such particles require the greatest time to settle and offer the greatest resistance to filtration.

In order to bring about the association of the particles to be removed from the liquid it is necessary to bring them into contact with each other with an impact above a critical value dependent upon the size and character of the particles. Furthermore, the flocs, when formed, are relatively delicate and fragile and become more so as their size increases and, if broken up, are extremely difficult, if not impossible, to reform. It is imperative, therefore, that the impact of the particles with flocs partially or completely formed and the impact of such flocs with each other be below that critical value at which the flocs are broken up dependent upon the size of the flocs and the character of the material forming them.

Heretofore it has been the practice to form flocs by association, employing paddles for the agitation of the liquid containing the particles of material to be removed. Obviously the degree of agitation of the liquid, and hence the force of impact of the particles with each other and with the partially or completely formed flocs, varies between wide limits and is impossible of accurate control. If the degree of agitation a short distance from the moving paddles is favorable for the aggrandizing association of the particles, the degree of agitation adjacent the paddles is so high as to be destructive of the partially or completely formed flocs, and the degree of agitation remote from the paddles is of such small value as to make the associating action negligible, with the result that the greater part of the liquid is idly awaiting a degree of agitation favorable for association of the particles.

In addition, in the early stages of the aggrandizing association process, when there are being formed nuclei comparatively resistant to destruction by impact with the particles or other nuclei, it is desirable that the agitation or mixing be relatively rapid in order that the nuclei will be formed in the greatest possible number and with the greatest possible rapidity. As the aggrandizing association process continues, the flocs grow in size, their fragility increases, and hence it is desirable that the degree of agitation and the force of contact of the flocs with each other and the particles be diminished.

Devices employing paddles for the impacting of the particles with each other and with the flocs are incapable of providing this variation in the degree of such impacts necessary during the performance of the process. As a result of these inherent deficiencies of such devices, they require unnecessarily large agitating tanks and settling tanks and frequently are capable only of providing a supernatant liquid rendered turbid by the material particles or broken flocs unremoved.

It is an object of my invention to provide a method of and apparatus for removing particles distributed in a liquid by aggrandizing association in which the particles throughout substantially the entire body of liquid are subjected to suitable degrees of agitation, so that no part of the liquid is idly awaiting treatment and in which the degree of agitation may be easily varied between wide limits uniformly as the associating process is continued, so that the flocs progressively grow in mass and dimensions and are not subjected to the movement or contacts tending to their destruction.

The principles underlying my invention can best be understood by reference to the accompanying drawings, in which Fig. 1 is a diagrammatic illustration of the conditions existent in a body of liquid between two walls or boundaries AB and CD when these boundaries are moved parallel to each other at such a velocity as to induce laminar flow;

Fig. 2 is a vertical elevational view partially sectioned of one form of apparatus of my invention capable of performing my method;

Fig. 3 is a vertical sectional view of the agitating tank of the apparatus illustrated in Fig. 2;

Figure 4:
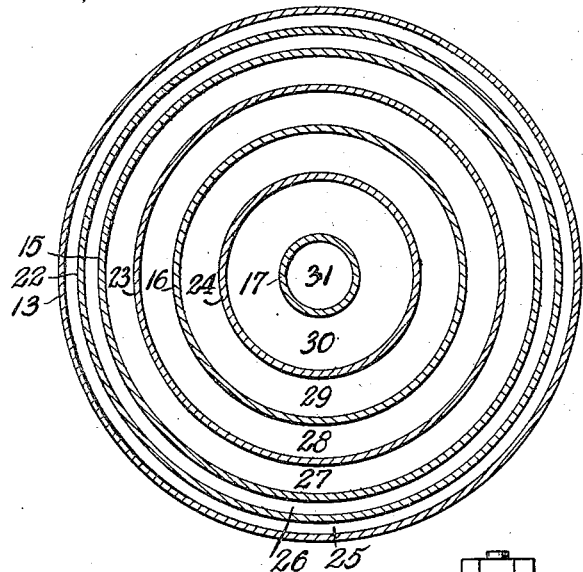
Fig. 4 is a horizontal sectional view taken as indicated by the line 4—4 of Fig. 3.

The principle utilized in the apparatus and method of my invention by which the objects primarily stated are accomplished may be best understood by reference to Fig. 1 in which AB and CD represent substantially parallel walls or boundaries between which there is confined a body of liquid E. If it be assumed that the boundary AB is maintained stationary and the boundary CD is moved to the right at a constant rate of speed, the liquid E may be considered as composed of an infinite number of lamellae or laminae parallel to the boundaries AB and CD, the relative velocities of which in the direction of motion of the boundary CD are indicated by the length of the arrows 6. The velocity of any particular lamella or lamina is dependent upon the velocity of the moving boundary CD, the nature of the surface of the boundaries AB and CD, the distance of that lamella or lamina from the boundary CD, and the nature of the liquid, these velocities vary from substantially nil adjacent the boundary AB to a maximum value adjacent the boundary CD. Except for an extremely small portion of the liquid immediately adjacent the boundary CD, the motion imparted to the laminae will be that of non-turbulent flow if the rate of such relative motion is not excessive.

As the particles of material to be removed from the liquid in any particular lamina move with this non-turbulent flow, of necessity they pass in close proximity to the particles of such material in the two laminae immediately adjacent and in contact therewith. The velocity of the particles moving in such adjacent laminae differs only slightly from the velocity of the particles in this intermediate lamina, and their force of contact is governed by this difference in the rise of laminar flow, which may be easily and accurately controlled by the velocity of the relative motion of the boundaries CD and AB and the distance between them.

If the rate of relative motion of the boundaries is sufficiently high, the flow of the liquid between them will be turbulent. However, such relative movement of the boundaries subjects the liquid passing between them to shearing stress varying in value regularly across the body of liquid E. Hence, even though a condition of turbulence exists, the shearing stresses thus imposed upon adjacent portions of the liquid E spaced transversely of the boundaries AB and CD differ only slightly with the result that the force of contact of adjacent particles of material to be removed is more uniform, easily controlled, and conducive to the aggrandizing association of such particles.

In accordance with this principle it is an object of my invention to provide a method and an apparatus which subjects liquid containing particles to be associated to shearing stresses of values readily controllable to provide throughout the entire body of liquid a substantially uniform force of impact of the particles and the nuclei and the flocs and to vary this force of impact during the aggrandizing association process in a manner most conducive to the formation of flocs of the particular character best adapted for sedimentation or filtration.

In Figs. 2 to 4, inclusive, in which is illustrated one form of apparatus capable of performing such a method, the numeral 11 indicates an associating device or tank supplied with the desired chemicals from a supply tank or receptacle 9 and discharging the liquid containing the coagulated and coalesced materials to a settling tank 10.

As is best illustrated in Figs. 3 and 4, the associating tank 11 includes a container or receptacle 12 comprising a cylindrical side wall 13 open at the top and closed at the bottom with an end plate 14. Mounted upon the end plate 14 concentrically with the cylindrical wall 13 is a plurality of wall means or members in the form of upwardly projecting cylinders 15, 16, and 17, all of which are open at their upper ends. While the upwardly projecting cylinders 15, 16, and 17 may be of the same height, they may, if desired, be so formed as to diminish in height or axial dimension progressively centrally as illustrated in the drawings. The central upwardly projecting cylinder 17 communicates at its lower end through an opening 18 in the end plate 14 with a discharge or outlet pipe 19 of substantially the same diameter. The receptacle 12 and the upwardly projecting cylinders 15, 16, and 17 may be considered as a plurality of primary wall members and is indicated generally by the numeral 20.

The numeral 21 indicates a plurality of secondary wall members and, as illustrated, includes a top plate 21a within and adjacent the upper edge of the receptacle 12 and supporting within the receptacle 12 a plurality of wall means or wall members in the form of depending cylinders 22, 23, and 24. The depending cylinders 22, 23, and 24 may be made of the same axial lengths, or, if desired, they may be made of varying axial lengths diminishing centrally of the receptacle 12 as illustrated in Fig. 3.

The depending cylinders 22, 23, and 24 are disposed in alternating relationship with the upwardly projecting cylinders 15, 16, and 17 to provide annular concentric liquid passages 25 (between the cylindrical wall 13 of the receptacle 12 and the depending cylinder 22), 26 (between the depending cylinder 22 and the upwardly projecting cylinder 15), 27 (between the upwardly projecting cylinder 15 and the depending cylinder 23), 28 (between the depending cylinder 23 and the upwardly projecting cylinder 16), 29 (between the upwardly projecting cylinder 16 and the depending cylinder 24), and 30 (between the depending cylinder 24 and the upwardly projecting cylinder 17), and a cylindrical passage 31 within the upwardly projecting cylinder 17.

Each of these liquid passages communicates with the liquid passage adjacent around the end of the cylinder separating them, the central passage 31 communicating with the outlet pipe 19, and the outer passage 25 communicating adjacent its upper end with the chemical feeding tank 9 through a pipe 32 having a control valve 33 therein and also communicating with a source of supply of liquid containing the material to be removed therefrom through a pipe 34 having a control valve 35 therein. As can be most readily seen from Fig. 4, the outermost passage 25 is made of a width or radial thickness less than that of any of the other liquid passages, and the liquid passages 26 to 31, inclusive, increase progressively in width or radial thickness.

The top plate 21a which is supported in any suitable manner, not shown, is rotated by a shaft 36 connected to a ring gear 37 driven by a pinion 37a, which is secured to the drive shaft 38 of a suitable electric motor 39.

The discharge pipe 19 of the receptacle 12 is connected to the settling tank 10, which is provided near its top with an outlet pipe 40 and at its lower end with a discharge pipe 41 having a control valve 42 therein for the drawing off of sludge or sediment.

In the apparatus being assembled as illustrated and described, the liquid to be purified is run at the desired rate through the inflow pipe 34 controlled by the valve 35, and the flocculating or precipitating chemicals are supplied from the tank 9 through the pipe 32 at the desired rate controlled by the valve 33. The motor 39 being energized, the plurality of secondary wall members 21, including the cylinders 22, 23, and 24, are caused to rotate.

The liquid is mixed with the chemical agent from the tank 9 within the annular liquid passage 25. Because the thickness or radial width of the passage 25 is less than that of any of the other liquid passages, and, because the cylinder 22 is travelling at a greater peripheral speed than either of the cylinders 23 or 24, it will be apparent that the liquid within the passage 25 is subjected to the maximum shearing stress. The rate of rotation of the secondary wall members 21 and the relative radial dimensions of the passages 25 to 31, inclusive, may be readily related so that the flow of the liquid is turbulent in the passage 25 and laminar in the passages 26 to 31, inclusive, if desired.

The passage 25 may therefore be considered as a mixing zone and the passages 26 to 31, inclusive, as an associating zone or tortuous passage. This results in the maximum number and force of impacts of the particles of material to be removed from the liquid supply with themselves and the chemical agent from the tank 9 and the precipitates thus formed. The radial distance between the depending cylinder 22 and the cylindrical wall 13, the peripheral speed of the depending cylinder 22 and the time of flow of the liquid and chemicals through the passage 25 are so related to the character of the materials to be removed and the nuclei there formed as to cause the formation of the maximum number of such nuclei within the passage 25.

Leaving the passage 25, the liquid bearing the nuclei flows through the passage 26, which is in effect a continuation of the passage 25. The shearing stress imposed by the rotating depending cylinder 22 being imposed upon the same side of the stream and applied in the same direction, the thickness or radial width of the passage 26 being greater than that of the passage 25, and the peripheral speed of the depending cylinder 22 being the same in the passage 26 as in the passage 25, the velocity gradient across the passage 26 is less than the velocity gradient across the passage 25, causing the difference in the rate of motion of the particles and nuclei adjacent transversely of the passage 26 induced by movement of the cylinder 22 to be less than such difference in the passage 25. The force of impact of the material particles with each other and the nuclei with each other and the particles and nuclei with each other in the passage 26 is therefore less than the force of such impacts in the passage 25 and hence less conducive to the destruction of the flocs commencing to form in the passage 26.

From the passage 26 the liquid with the partially formed flocs flows into the passage 27 and thence the passages 28, 29, 30, and 31, each of which is a continuation of the preceding liquid passage. Because each such passage is of larger cross-sectional area than the preceding passage, there is a lesser difference in the rate of flow of the particles and the flocs adjacent transversely of such passage than in the preceding passage, and hence less destruction to the flocs partially or completely formed. It will be seen that the velocity gradient of the flow across the liquid passages may be varied to any extent desired by varying the thickness or radial width of these passages and may be so related to the number of cylinders or total length of the liquid passages and the rate of rotation of the cylinders and the time of flow of the liquid through all of the passages as to be the most conducive for the formation and preservation of flocs of the desired size for the particular material undergoing aggrandizing association.

The liquid with material associated into flocs of the desired dimensions is withdrawn from the central upwardly extending cylinder 17 through the pipe 19 to the settling tank 10. The pipe 19 is made of cross-sectional area equal to or greater than the cross-sectional area of the upwardly extending cylinder 17, so that the velocity of the floc-bearing liquid in the pipe 19 is equal to or less than its velocity in the upwardly extending cylinder 17, thus preserving the flocs intact.

The settling tank 10 is made of such dimensions as to provide quiescence for the time required for the sedimentation of the flocs therein, the settled flocs being withdrawn through the valved pipe 41, and the clarified effluent being withdrawn through the pipe 40 controlled by any suitable manual or automatic valve, not shown in the drawings. The liquid may be subjected to filtration in a filter of any suitable construction in lieu of or in addition to the settling action performed in the tank 10.

Figure 5:
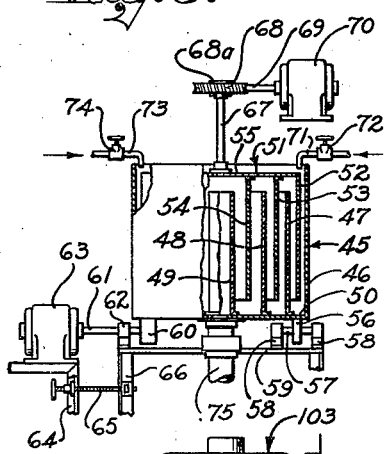
Fig. 5 is a vertical elevational view partially sectioned of an alternative embodiment of the apparatus of my invention likewise capable of performing my method.

In the alternative embodiment of the apparatus of my invention also capable of performing my method, which is illustrated in Fig. 5, the numeral 45 indicates a plurality of primary wall members, including upwardly projecting cylinders 46, 47, 48, and 49 connected to and supported by an end plate 50 at their lower ends and open at their upper ends. The numeral 51 indicates a plurality of secondary wall members, including depending cylinders 52, 53, and 54 connected to and supported by an end plate 55 at their upper ends and open at their lower ends. The upwardly extending cylinders 46 to 49, inclusive, and the depending cylinders 52 to 54, inclusive, are arranged in alternating relationship, the distances between adjacent of the cylinders increasing centrally as and for the purpose described in connection with the apparatus illustrated in Figs. 2 to 4, inclusive.

In this embodiment of my invention the lower end plate 50 is supported upon a roller 56 on a shaft 57 mounted in bearings 58 upon a support 59. It is supported also upon a roller 60 mounted for movement radially of the end plate 50 upon a shaft 61 which is supported in a bearing 62 and driven by an electric motor 63. The motor 63 is mounted upon a vertical support 64 connected by a threaded adjustment rod 65 to a fixed support 66, so that the motor 63, shaft 61, and driving roller 60 may be moved radially of the end plate 50 to vary the speed of rotation of the plurality of primary wall members or cylinders 45. The plurality of secondary wall members or cylinders 51 is rotated by a shaft 67 secured to a ring gear 68 driven by a pinion 68a on a drive shaft 69 of an electric motor 70 which may, if desired, be of the variable speed type.

The liquid to be clarified is supplied to the passage between the outer upwardly projecting cylinder 46 and the outer depending cylinder 52 through an inflow line 71 having a control valve 72 therein, the chemicals acting as flocculating or precipitating agents being supplied to the same passage through a line 73 having a control valve 74 therein. Liquid containing the flocculated material is withdrawn from the central upwardly projecting cylinder 49 through a discharge pipe 75 of equal or greater cross-sectional area and is delivered to either a settling tank, such as previously described, or a filter or first to a settling tank and, after the removal of the settled sludge, to a suitable filter.

The operation of this embodiment of my apparatus is the same as that previously described, except that in this form both the primary and secondary members rotate, preferably both in the same direction, and the speed of rotation of the primary wall members or cylinders may be readily varied by the manipulation of the adjustment rod 65 moving the driving roller 60 radially of the lower end plate 50. The speed of rotation of the secondary wall members or cylinders 51 may be independently varied by varying the speed of the motor 70.

Figure 6:
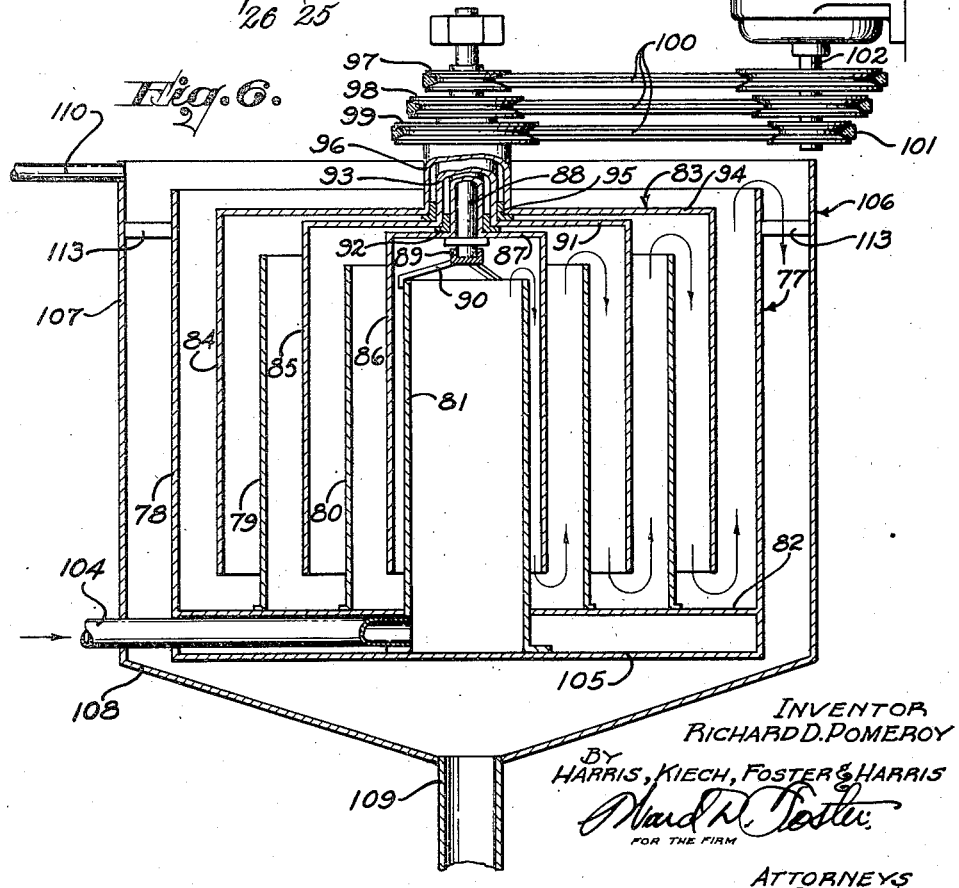
Fig. 6 is a vertical elevational view partially sectioned of another alternative embodiment of the apparatus of my invention likewise capable of performing my method.

In that embodiment of the apparatus of my invention capable of performing my method and illustrated in Fig. 6, the numeral 77 indicates a plurality of primary wall members in the form of upwardly extending cylinders 78, 79, 80, and 81 connected to and supported by an end plate 82 at their lower ends and open at their upper ends. The numeral 83 indicates a plurality of secondary wall members in the form of depending cylinders 84, 85, and 86. The innermost depending cylinder 86 is provided at its upper end with an end plate 87 non-rotatably secured to a shaft 88, the lower end of which is journaled in a hub 89 supported upon the upper end of the central upwardly extending cylinder 81 by a bracket 90. The intermediate depending cylinder 85 is provided at its upper end with an end plate 91 rotatably mounted upon a bearing member 92 interposed upon the end plate 87 and is non-rotatably secured to a shaft 93. The outermost depending cylinder 84 is provided at its upper end with an end plate 94 rotatably mounted upon a bearing member 95 disposed upon the end plate 91 and is non-rotatably secured to a shaft 96.

The shafts 88, 93, and 96 are concentrically disposed and are provided with driven pulleys 97, 98, and 99, respectively. Each of the driven pulleys 97 to 99, inclusive, is connected by a belt 100 to one of the driving pulleys 101 mounted upon a shaft 102 and rotated by an electric motor 103, which may be of the variable speed type.

Liquid to be clarified and containing the chemicals for its treatment is delivered to the innermost cylinder 81 through an inflow line 104. The outermost cylinder 78 of the primary wall members 77 extends downwardly below the end plate 82 and with a bottom plate 105 connected to its lower end defines a space through which the inflow line 104 extends to communicate with the cylinder 81. Surrounding the primary wall members 77 is a settling tank 106 having side walls 107 extending above and below the primary wall members 77 and supporting the primary wall members 77 by arms 113 and having a conical bottom 108 communicating at its center with an outlet pipe 109 controlled by a suitable valve, not shown, for withdrawing precipitate. An overflow pipe 110 is provided adjacent the upper end of the settling tank 106 for the withdrawal of effluent.

The operation of this form of the apparatus of my invention is similar to that described with regard to the two other embodiments, except that the direction of flow is from the center outwardly and the thickness or radial width of all of the liquid passages other than the innermost passage between the upwardly extending cylinder 81 and the depending cylinder 86 is the same, this innermost passage being restricted in cross-sectional area and constituting a mixing zone. In this embodiment of my invention the secondary wall members are driven at different speeds through the pulleys 97, 98, and 99 of different diameters, thus establishing velocity gradients of different value for the laminar flow across the liquid passages, this value decreasing along the path of travel of the liquid and being the smallest in the outermost passage defined by the upwardly projecting cylinder 78 and the depending cylinder 84 from which the liquid with the material flocculated therein overflows into the settling tank 106. The liquid withdrawn from the settling tank 106 through the outlet pipe 110 may be subjected to filtration, as previously described.

My invention is capable of embodiment in and practice with many modifications of the apparatus hereinbefore described; for example, the walls defining the boundaries of the liquid passage need not be cylindrical in cross-sectional outline but may be plane, one or both of the walls being moved through suitable packing members confining the liquid, such plane walls being either parallel to each other or diverging from each other to any desired degree.

Similarly, if walls circular in cross-sectional outline are employed, they need not be cylindrical but may have any desired shape, such, for example, as conical or frusto-conical, so that the width of the path of the liquid is varied at any desired rate and to any desired degree. Likewise, any or all of the walls confining the boundaries of the liquid passage may be moved and, if two or more of such walls are moved, they may be moved in the same or opposite directions. Also, if concentric walls, such as hereinbefore described, are employed, all or any of them may be rotated at the same or at different peripheral speeds, and they may be spaced from each other either uniform or different distances.

While I have described some embodiments of the apparatus of my invention in which the liquid is delivered to the outer portion of the device and withdrawn from its center, the liquid can be delivered to the center of the apparatus and withdrawn from its outer portion, as illustrated in Fig. 6. The flocculating or precipitating agent may be added to the liquid before it is introduced into the coagulating tank, and the liquid may, if desired, have formed in it nuclei or incomplete flocs before its delivery to the coagulating tank.

If desired, the mixing zone may be eliminated and the process made one entirely of aggrandizing association, as, for example, by supplying the liquid to the receptacle 12 through an inlet pipe 111 having a valve 112 therein and communicating with the bottom of the passage 26 as illustrated in Fig. 3, no liquid or chemicals being supplied through the pipes 32 or 34.

While the apparatus and method of my invention has been described as applied to the removal of material dispersed in liquids, such as water, sewage, and industrial waste water, its application is not so limited, for both the method and apparatus can be advantageously used for removing numerous materials, including both solids and liquids distributed in a liquid, as a solute, suspensoid, or emulsoid, colloidal or otherwise.

From the foregoing it will be apparent that the method of my invention may be practiced employing many forms of apparatus other than those hereinbefore described, and that neither the apparatus nor the method of my invention is limited to the specific embodiments hereinbefore described but includes all of the variations thereof coming within the scope of the claims which follow.

I claim as my invention:

1. In an apparatus for agglomerating or coalescing a material distributed in a liquid, the combination of: a plurality of primary wall members; a secondary wall member projecting between said primary wall members; liquid supply means; liquid withdrawing means, said means being so related to said primary wall members that liquid flows between said primary wall members around said secondary wall member; and drive means adapted for producing relative movement of said wall members, whereby the liquid therebetween is subjected to shearing stress, said primary wall members being so spatially related to said secondary wall member that the value of such stress is varied along the path of travel of the liquid therebetween the spacing between said primary and secondary wall members being increased in the direction of travel of the liquid whereby shearing stresses are correspondingly reduced.

2. In an apparatus for agglomerating or coalescing a material distributed in a liquid, the combination of: a container; a plurality of primary wall members in said container; a plurality of secondary wall members supported in said container, said primary and secondary members being of circular outline in transverse cross section and each of said secondary members projecting between adjacent of said primary members, whereby liquid passing through said container is directed in a path between alternating primary and secondary members, said members being so spatially related that the transverse dimension of such stream increases therealong; means for supplying liquid to said container; means for withdrawing liquid from said container; and means for rotating said primary or secondary wall members relative to the other of said members, whereby the liquid therebetween is subjected to shearing stress.

3. The method of separating an impurity from a liquid in which it is distributed, which includes the steps of: passing the liquid through a confined space; directing particles of the material into flocculating impact by imposing shear stress on the liquid transversely of such space diminishing in value with the progress of the flocculation; and so relating the time of passage of the liquid through such space, the length and width of such space, and the shear stress to the flocculating property of such distributed impurity that substantially all of such impurity is flocculated to bodies of separable masses during passage through such space.

4. In an apparatus for separation by agglomeration of a material from a liquid in which it is distributed, the combination of: wall means defining a passage through which the liquid may flow; and drive means adapted for inducing relative movement of said wall means, whereby substantially all of the liquid is subjected to shearing stress, said drive means and said wall means being so related that such stress varies along said passage, the transverse dimension of said passage being increased in the direction of liquid flow whereby shearing stress is reduced in said direction of flow.

5. In an apparatus for separation by agglomeration of an impurity from a liquid in which it is distributed, the combination of: a plurality of primary wall members; a secondary wall member projecting between said primary wall members, said primary and secondary wall members being substantially circular in transverse cross section, the radial dimensions of spacings between said primary and secondary circular wall members increasing in the direction of flow; liquid supply means; liquid withdrawing means, said means being so related to said primary wall members that liquid flows between said primary wall members around said secondary wall member; and drive means adapted for producing relative movement of said wall members, whereby the liquid therebetween is subjected to shearing stress.

6. In an apparatus for agglomerating or coalescing a material distributed in a liquid, the combination of: a plurality of primary wall members; a secondary wall member projecting between said primary wall members; liquid supply means; liquid withdrawing means, said means being so related to said primary wall members that liquid flows between said primary wall members around said secondary wall member; means adapted for supplying a flocculating agent to the liquid; and drive means adapted for producing relative movement of said wall members, whereby the liquid therebetween is subjected to shearing stress, said primary wall members being so spatially related to said secondary wall member that the value of such stress is varied along the path of travel of the liquid therebetween, the transverse dimensions between said primary and secondary wall members increasing in the direction of liquid flow.

7. In an apparatus for agglomerating or coalescing a material distributed in a liquid, the combination of: a container; a plurality of primary wall members in said container; a plurality of secondary wall members supported in said container, said primary and secondary members being of circular outline in transverse cross section and each of said secondary members projecting between adjacent of said primary members, whereby liquid passing through said container is directed in a path between alternating primary and secondary members, said members being so spatially related that the transverse dimension of such stream increases therealong; means for supplying liquid and a flocculating agent to said container; means for withdrawing liquid from said container; and means for rotating said primary or secondary wall members relative to the other of said members, whereby the liquid therebetween is subjected to shearing stress.

8. In an apparatus for separation by agglomeration of an impurity from a liquid in which it is distributed, the combination of: a plurality of primary wall members; a secondary wall member projecting between said primary wall members, said primary and secondary wall members being substantially circular in transverse cross section and substantially cylindrical in form; liquid supply means; liquid withdrawing means, said means being so related to said primary wall members that liquid flows between said primary wall members around said secondary wall member, and the radial dimensions of the intervening spaces being successively increased in the direction of flow; and drive means adapted for producing relative movement of said wall members, whereby the liquid therebetween is subjected to shearing stress.

9. In an apparatus for agglomerating or coalescing a material distributed in a liquid, the combination of: a plurality of primary wall members; a secondary wall member projecting between said primary wall members; liquid supply means; liquid withdrawing means, said means being so related to said primary wall members that liquid flows between said primary wall members around said secondary wall member; means adapted for supplying a flocculating agent to the liquid; and drive means adapted for producing relative movement of said wall members, whereby the liquid therebetween is subjected to shearing stress, said primary wall members being so spatially related to said secondary wall member that the value of such stress is varied along the path of travel of the liquid therebetween, said primary and secondary wall members being substantially cylindrical in form and the radial spacings between adjacent wall members increasing in the direction of flow.

RICHARD D. POMEROY.